(12) United States Patent
Hall et al.

(10) Patent No.: US 11,321,069 B2
(45) Date of Patent: May 3, 2022

(54) SYSTEM AND METHOD FOR SUPPLYING ON-PREMISE HYPER-CONVERGED SYSTEMS

(71) Applicant: VMware, Inc., Palo Alto, CA (US)

(72) Inventors: Michael L. Hall, Austin, TX (US); Sridevi Ravuri, Sunnyvale, CA (US); Rajesh Agarwalla, San Ramon, CA (US); Emily Hong Xu, Palo Alto, CA (US); Venkat Deep Rajan, Austin, TX (US); Andrew T. Chin, Austin, TX (US); Hasan Mahmood, Round Rock, TX (US); Sushil Shripal Munot, Sunnyvale, CA (US); Yateendra Kulkarni, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 254 days.

(21) Appl. No.: 16/655,166

(22) Filed: Oct. 16, 2019

(65) Prior Publication Data
US 2021/0117175 A1   Apr. 22, 2021

(51) Int. Cl.
*G06F 9/44* (2018.01)
*G06F 8/65* (2018.01)
*G06F 9/455* (2018.01)
*H04L 29/06* (2006.01)

(52) U.S. Cl.
CPC ............ *G06F 8/65* (2013.01); *G06F 9/45558* (2013.01); *H04L 63/0281* (2013.01); *G06F 2009/4557* (2013.01); *G06F 2009/45595* (2013.01)

(58) Field of Classification Search
CPC ............... G06F 8/65; G06F 9/45558; G06F 2009/4557; G06F 2009/45595; H04L 63/0281
See application file for complete search history.

(56) References Cited

U.S. PATENT DOCUMENTS

| 2012/0084769 | A1* | 4/2012 | Adi | G06F 8/63 |
| | | | | 717/174 |
| 2017/0013508 | A1* | 1/2017 | Pallas | H04W 76/12 |
| 2018/0145955 | A1* | 5/2018 | Nirwal | H04L 9/08 |
| 2018/0181417 | A1* | 6/2018 | Nallapareddy | H04L 63/10 |
| 2019/0140915 | A1* | 5/2019 | Flavel | H04L 12/4641 |
| 2019/0141049 | A1* | 5/2019 | Plichta | H04L 63/308 |

* cited by examiner

*Primary Examiner* — Hang Pan
*Assistant Examiner* — Lenin Paulino
(74) *Attorney, Agent, or Firm* — Loza & Loza, LLP

(57) ABSTRACT

A system and method for supplying on-premise hyper-converged systems uses a cloud service to receive orders for the on-premise hyper-converged systems from customers and to request a system integrator to procure hardware components of the on-premise hyper-converged systems and to assemble hardware components to produce assembled systems. Software components are remotely installed and configured in the assembled systems from the cloud service using bring-up appliances in virtual private clouds created for the on-premise hyper-converged systems to deploy software-defined data centers (SDDCs) in the on-premise hyper-converged systems. The resulting on-premise hyper-converged systems with the deployed SDDCs can then used by the customers.

20 Claims, 10 Drawing Sheets

SYSTEM AND METHOD FOR SUPPLYING ON-PREMISE HYPER-CONVERGED SYSTEMS

BACKGROUND

Current hybrid cloud technologies allow software-defined data centers (SDDCs) to be deployed in a public cloud, such as the VMware Cloud on AWS solution, which allows entities, such as enterprises, to modernize, protect and scale their applications leveraging the public cloud. However, some entities cannot move their SDDCs to the public cloud, either because the data cannot leave their premises, or the compute power needs to be close to the applications at their edge locations.

Unfortunately, in many instances, entities do not have internet technology (IT) staff on site to manage their SDDCs, especially those deployed at their edge locations. Thus, some entities would prefer to delegate SDDC management to someone else so that these entities can focus on managing the applications deployed on the SDDCs instead of managing the infrastructure itself.

SUMMARY

A system and method for supplying on-premise hyper-converged systems uses a cloud service to receive orders for the on-premise hyper-converged systems from customers and to request a system integrator to procure hardware components of the on-premise hyper-converged systems and to assemble hardware components to produce assembled systems. Software components are remotely installed and configured in the assembled systems from the cloud service using bring-up appliances in virtual private clouds created for the on-premise hyper-converged systems to deploy software-defined data centers (SDDCs) in the on-premise hyper-converged systems. The resulting on-premise hyper-converged systems with the deployed SDDCs can then used by the customers.

A computer-implemented method for supplying on-premise hyper-converged systems in accordance with an embodiment of the invention comprises receiving orders for the on-premise hyper-converged systems from customers at a cloud service, in response to the orders, requesting a system integrator to procure hardware components of the on-premise hyper-converged systems, including physical gateway appliances, to assemble the hardware components to produce assembled systems and to connect the assembled systems to a software-defined wide area network (SD-WAN) using the physical gateway appliances to initiate a bring-up process for each of the assembled systems, in response to each bring-up process initiation, creating a virtual private cloud for each of the on-premise hyper-converged systems in a public cloud computing environment, deploying a bring-up appliance in each of the virtual private clouds, remotely installing and configuring software components in the assembled systems using the bring-up appliances to deploy software-defined data centers (SDDCs) in the assembled systems to produce the on-premise hyper-converged systems, and notifying the system integrator that each bring-up process is complete to signal the system integrator to ship the on-premise hyper-converged systems to the customers so that the customers can connect the on-premise hyper-converged systems to the SD-WAN using the physical gateway appliances of the on-premise hyper-converged systems and use the SDDCs deployed in the on-premise hyper-converged systems. In some embodiments, the steps of this method are performed when program instructions contained in a non-transitory computer-readable storage medium are executed by one or more processors.

A system in accordance with an embodiment of the invention comprises memory and at least one processor configured to receive orders for on-premise hyper-converged systems from customers at a cloud service, in response to the orders, request a system integrator to procure hardware components of the on-premise hyper-converged systems, including physical gateway appliances, to assemble the hardware components to produce assembled systems and to connect the assembled systems to a software-defined wide area network (SD-WAN) using the physical gateway appliances to initiate a bring-up process for each of the assembled systems, in response to each bring-up process initiation, create a virtual private cloud for each of the on-premise hyper-converged systems in a public cloud computing environment, deploy a bring-up appliance in each of the virtual private clouds, remotely install and configure software components in the assembled systems using the bring-up appliances to deploy software-defined data centers (SDDCs) in the assembled systems to produce the on-premise hyper-converged systems, and notify the system integrator that each bring-up process is complete to signal the system integrator to ship the on-premise hyper-converged systems to the customers so that the customers can connect the on-premise hyper-converged systems to the SD-WAN using the physical gateway appliances of the on-premise hyper-converged systems and use the SDDCs deployed in the on-premise hyper-converged systems.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
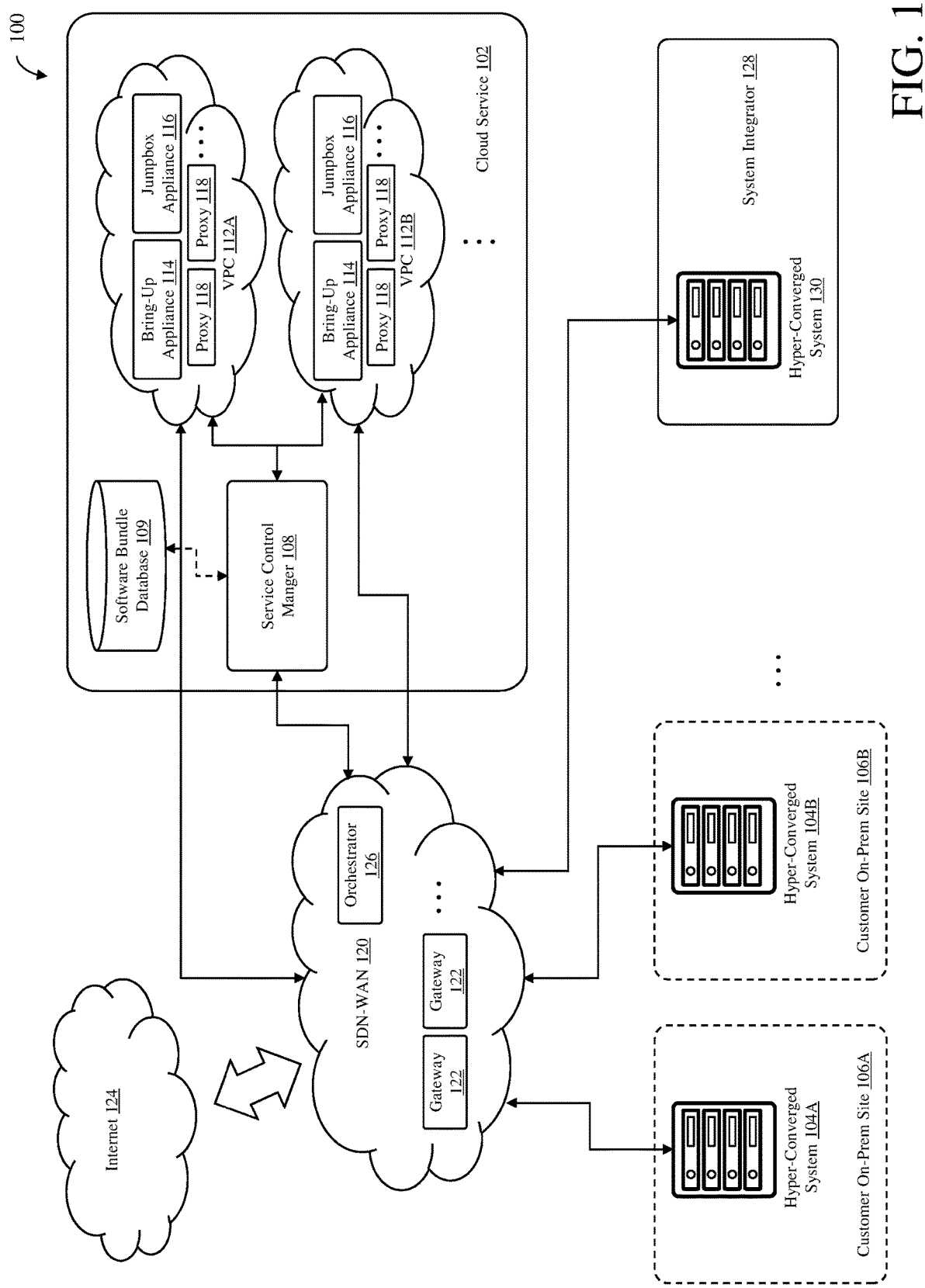
FIG. 1 is a block diagram of a distributed system for supplying and managing on-premise hyper-converged systems in accordance with an embodiment of the invention.

FIG. 1 shows a distributed system 100 for supplying and managing on-premise hyper-converged systems in accordance with an embodiment of the invention. Each on-premise hyper-converged system is a complete network infrastructure with the necessary software components already installed and configured to support and operate one or more software-defined data centers (SDDCs) at any on-premise sites. Thus, each on-premise hyper-converged system includes hardware, such as physical servers and network switches, which may be installed in one or more server racks to support the desired number of SDDCs with at least all the necessary virtualization software components already installed to support virtual computing instances, such as virtual machines, to process workloads.

Traditionally, the process of building up a physical system to support one or more SDDCs for use at an on-prem site involves many steps and challenges. Typically, an entity (sometimes referred to herein as a customer), which may be a business enterprise, orders hardware from one or more hardware vendors, orders software from one or more software vendors, and then install the software on the hardware themselves, or call for professional service to help. Some of the challenges of this traditional approach include:

(1) The customer needs to deal with hardware/software compatibility issues. Since hardware and software are commonly released by different vendors and at different times, it is difficult to maintain the software/hardware compatibility.

(2) Since versions of hardware and software are released often, the versions of hardware and software that the customer install could already be stale and newer versions may exist.

(3) In many instances, the customer does not have local Internet Technology (IT) staff to perform the installation and solve any issues during the installation. Thus, the customer must send in someone onsite to perform the job.

(4) Passwords/secrets are in the possession of the installers/professional service personnel. This exposes the customer's infrastructure and data to security risks.

(5) Once the system is installed locally on-premises, it is up to the customer to maintain the system. This could be a burden to the entity, especially for those edge locations where no local IT staff is available. The system may be left unmaintained for years with older software versions, etc.

The distributed system 100 addresses these challenges by providing on-premise hyper-converged systems with all the necessary software properly installed and configured so that the on-premise hyper-converged systems are ready to operate when received at the on-prem sites of the customers. Once the on-premise hyper-converged systems are operating at the on-prem sites, the on-premise hyper-converged systems can be managed as a service.

As shown in FIG. 1, the distributed system 100 includes a cloud service 102 that supplies on-premise hyper-converged systems 104 (e.g., 104A, 104B . . . ) to customers and also manages the on-premise hyper-converged systems once the systems are operating at on-prem sites 106 (e.g., 106A, 106B . . . ) of the customers. The cloud service 102 includes a service control manager 108, which controls a bring-up process to produce each on-premise hyper-converged system in response to orders from customers. The bring-up process includes remote installation and configuration of software components in the on-premise hyper-converged system being built. The cloud service 102 also includes a database 109 of software bundles that are used by the service cloud manager 108 to install and configure the on-premise hyper-converged systems being built. In an embodiment, the software bundles in the database 109 are software bundles that have been validated for installation on managed systems, e.g., the on-premise hyper-converged systems 104. During each bring-up process of a new on-premise hyper-converged system, the service cloud manager 108 selects the latest software bundle that applies to the specific hardware configuration that will be brought up and configured.

The cloud service 102 further includes a number of shadow virtual private clouds (VPCs) 112 (e.g., 112A, 112B . . . ), which are assigned to the currently operating on-premise hyper-converged systems 104. Thus, the VPC 112A is assigned to the on-premise hyper-converged system 104A, the VPC 112B is assigned to the on-premise hyper-converged system 104B, and so on. Each VPC is used to deploy a bring-up appliance 114 that operates to manage the bring-up process for a new prem hyper-converged system. The tasks that may be performed by the bring-up appliance 114 will be described below in detail. Each VPC is also used to deploy a jumpbox appliance 116 that allows a site reliability engineer (SRE) or the customer access to the respective VPC, and thus, the associated on-premise hyper-converged system, in particular, any SDDC running on the on-premise hyper-converged system. These appliances can be implemented as one or more software programs/applications running in a cloud computing environment. In a particular implementation, these appliances are on-demand virtual machines that are deployed in the VPCs as needed.

Each VPC 112 also includes a number of reverse proxies 118 that are used to access various software components supporting one or more SDDCs in the corresponding on-premise hyper-converged system. As an example, the reverse proxies may be used to access a virtualization manager, e.g., a VMware vCenter Server® product, and a logical network manager, e.g., a VMware NSX™ manager running on the corresponding on-premise hyper-converged system.

As shown in FIG. 1, the distributed system 100 further includes a software-defined wide area network (SD-WAN) 120, which allows the cloud service 102 to connect to the different on-premise hyper-converged systems 104 running at different on-prem sites 106. As explained below, each on-premise hyper-converged system includes a physical edge appliance that connects to the SD-WAN 120 via one of a number of gateways 122 of the SD-WAN, which reside in a cloud computing environment. The gateways 122 of the SD-WAN 120 also allow connections between the various VPCs 112 and the Internet 124. In an embodiment, each VPC 112 is connected to one of the gateways 122 of the SD-WAN 120 via an Internet Protocol Security (IPsec) virtual private network (VPN) tunnel. The SD-WAN 120 includes an orchestrator 126, which controls and manages the connections to the SD-WAN. In an embodiment, the SD-WAN 120 is a VeloCloud™ SD-WAN, which is an SD-WAN provided as a service. Thus, in this embodiment, the physical edge appliance in each on-premise hyper-converged system 104 is a VeloCloud™ physical edge appliance that connects to one of VeloCloud™ gateways via a SD-WAN tunnel. The VPCs 112 also connect to the VeloCloud™ gateways 122 using Internet Protocol Security (IPsec) virtual private network (VPN) tunnels to communicate with the corresponding on-premise hyper-converged systems 104. Also, in this embodiment, the orchestrator 126 is a VeloCloud™ orchestrator that oversees the connections to the VeloCloud™ SD-WAN 120.

The use of the SD-WAN 120, such as a VeloCloud™ SD-WAN, allows the cloud service 102 to connect to the on-premise hyper-converged systems 104, which may be connected to a wide variety of deployment topologies and WAN connections. Thus, the use of the SD-WAN 120 standardizes access to the managed on-premise hyper-converged systems 104 from the point of view of the cloud service 102. Further benefits of using this topology includes (1) adapts to customer's existing network topology, (2) avoids IP address space conflicts between customers, enabling the cloud service 102 to manage multiple customer networks, (3) segments networks by customers, enabling the cloud service 102 to manage multiple customer networks, (4) enables management and troubleshooting access to all of customers' managed systems from a single point (from within the corresponding shadow VPC), and (5) provides a secure channel for management traffic between the cloud service 102 and all of customers' managed systems.

The distributed system 100 also includes one or more system integrators 128 that procures the hardware for on-premise hyper-converged system orders, assembles the hardware into assembled systems and assists in the bring-up processes of the assembled systems to produce new on-premise hyper-converged systems 130. Thus, the system integrator 128 can be seen as a physical facility where hardware can be assembled and where software components can be installed and configured in the assembled systems. As explained below, the installation and configuration of a newly assembled system is executed remotely from the cloud service 102. In an embodiment, some of the operations performed by the system integrator 128 may be manual operations performed by one or more personnel of the system integrator. In an embodiment, the system integrator 128 may be a third-party entity with respect to the cloud service 102. That is, the system integrator 128 may be owned and operated by a business entity that is separate from the business entity that owns and operates the cloud service 102.

As explained in more detail below, when a new on-premise hyper-converged system is ordered from the cloud service 102, the system integrator 128 is instructed to procure the hardware, including a physical edge appliance, needed for the on-premise hyper-converged system. At the location of the system integrator 128, the hardware is then assembled and the assembled system is connected to the SD-WAN 120 via the physical edge appliance of the assembled system. Once connected to the SD-WAN 120, software components needed to create one or more SDDC in the assembled system are remotely installed and configured by the service control manager 108 using a bring-up appliance 114 deployed in a newly created VPC 112 in the cloud service 102 for the on-premise hyper-converged system being built. After all the software components have been installed and configured, the resulting on-premise hyper-converged system is shipped to the customer, where the on-premise hyper-converged system is connected to the customer's network and powered on for use by the customer. As the on-premise hyper-converged system is operating, the on-premise hyper-converged system is monitored and managed by the cloud service 102, which may include updating the software components in the on-premise hyper-converged system as needed.

Figure 2:
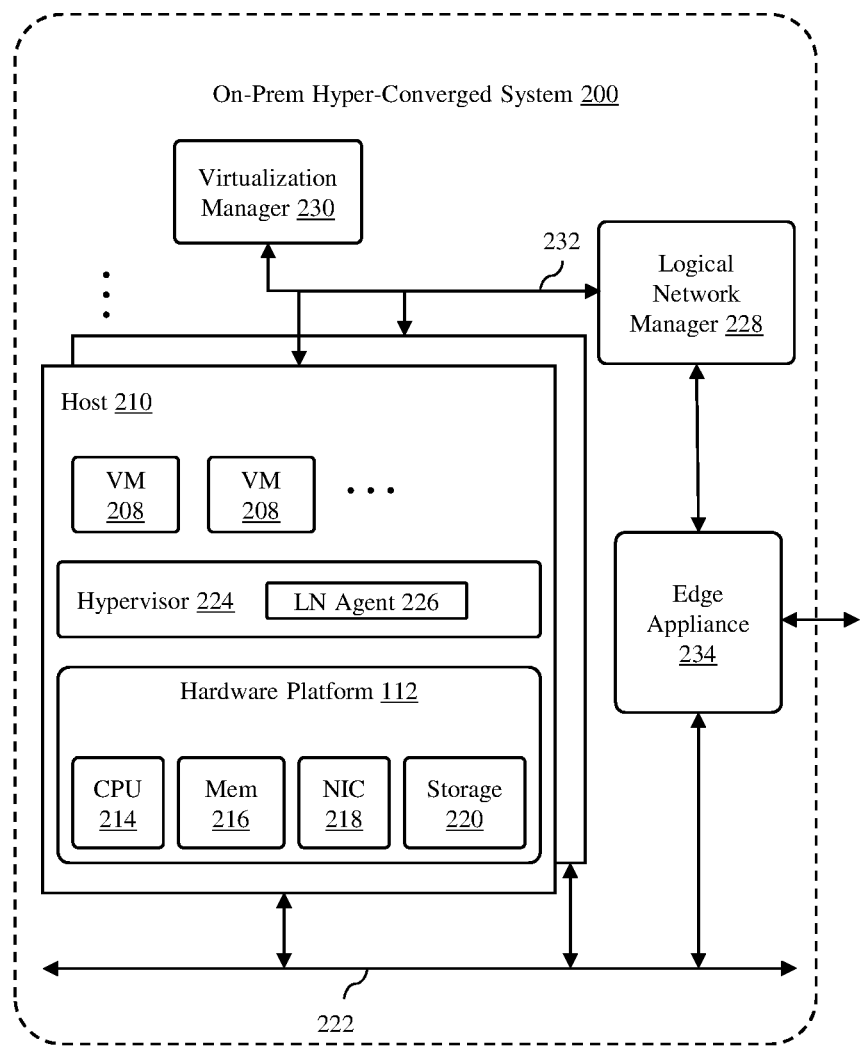
FIG. 2 is a block diagram an on-premise hyper-converged system in accordance with an embodiment of the invention.

Turning now to FIG. 2, an on-premise hyper-converged system 200 that is supplied and managed by the cloud service 102 in accordance with an embodiment of the invention is illustrated. As shown in FIG. 2, the on-premise hyper-converged system 200 includes one or more host computer systems ("hosts") 210. The hosts may be constructed on a server grade hardware platform 212, such as an x86 architecture platform. As shown, the hardware platform of each host may include conventional components of a computing device, such as one or more processors (e.g., CPUs) 214, system memory 216, a network interface 218, and storage 220. The processor 214 can be any type of a processor commonly used in servers. The memory 216 is volatile memory used for retrieving programs and processing data. The memory 216 may include, for example, one or more random access memory (RAM) modules. The network interface 218 enables the host 110 to communicate with other devices that are inside or outside of the on-premise hyper-converged system 200 via a communication medium, such as a network 222. The network interface 218 may be one or more network adapters, also referred to as a Network Interface Card (NIC). The storage 220 represents one or more local storage devices (e.g., one or more hard disks, flash memory modules, solid state disks and optical disks), which may be used to form a virtual storage area network (SAN).

Each host 210 may be configured to provide a virtualization layer that abstracts processor, memory, storage and networking resources of the hardware platform 212 into the virtual computing instances, e.g., virtual machines 208, that run concurrently on the same host. The virtual machines run on top of a software interface layer, which is referred to herein as a hypervisor 224, that enables sharing of the hardware resources of the host by the virtual machines. One example of the hypervisor 224 that may be used in an embodiment described herein is a VMware ESXi™ hypervisor provided as part of the VMware vSphere® solution made commercially available from VMware, Inc. The hypervisor 224 may run on top of the operating system of the host or directly on hardware components of the host. For other types of virtual computing instances, the host may include other virtualization software platforms to support those virtual computing instances, such as Docker virtualization platform to support "containers".

In the illustrated embodiment, the hypervisor 224 includes a logical network agent 226, which operates to provide logical networking capabilities, also referred to as "software-defined networking" (SDN). Each logical network may include software managed and implemented network services, such as bridging, L3 routing, L2 switching, network address translation (NAT), and firewall capabilities, to support one or more logical overlay networks in the on-premise hyper-converged system 200. The logical network agent 226 receives configuration information from a logical network manager 228 (which may include a control plane cluster) and, based on this information, populates forwarding, firewall and/or other action tables for dropping or directing packets between the virtual machines 208 in the host 210, and other virtual computing instances on other hosts, and/or outside of the on-premise hyper-converged system 200. Collectively, the logical network agent 226, together with other agents on other hosts, according to their forwarding/routing tables, implement isolated overlay networks that can connect arbitrarily selected virtual machines or other virtual computing instances with each other. Each virtual machine or virtual computing instance may be arbitrarily assigned a particular logical network in a manner that decouples the overlay network topology from the underlying physical network. Generally, this is achieved by encapsulating packets at a source host and decapsulating packets at a destination host so that virtual machines on the source and destination can communicate without regard to underlying physical network topology. In a particular implementation, the logical network agent 226 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as stateless transport tunneling (STT), Network Virtualization using Generic Routing Encapsulation (NVGRE), or Geneve, instead of, or in addition to, VXLAN.

The on-premise hyper-converged system 200 also includes a virtualization manager 230 that communicates with the hosts 210 via a management network 232. In an embodiment, the virtualization manager 230 is a computer program that resides and executes in a computer system, such as one of the hosts, or in a virtual computing instance, such as one of the virtual machines 208 running on the hosts. One example of the virtualization manager 230 is the VMware vCenter Server® product made available from VMware, Inc. The virtualization manager is configured to carry out administrative tasks for a cluster of hosts that forms a SDDC, including managing the hosts in the cluster, managing the virtual machines running within each host in the cluster, provisioning virtual machines, migrating virtual machines from one host to another host, and load balancing between the hosts in the cluster.

As noted above, the on-premise hyper-converged system 200 also includes the logical network manager 228 (which may include a control plane cluster), which operates with the logical network agents 226 in the hosts 210 to manage and control logical overlay networks in the on-premise hyper-converged system. Logical overlay networks comprise logical network devices and connections that are mapped to physical networking resources, e.g., switches and routers, in a manner analogous to the manner in which other physical resources as compute and storage are virtualized. In an embodiment, the logical network manager 228 has access to information regarding physical components and logical overlay network components in the on-premise hyper-converged system. With the physical and logical overlay network information, the logical network manager 228 is able to map logical network configurations to the physical network components that convey, route, and filter physical traffic in the on-premise hyper-converged system 200. In one particular implementation, the logical network manager 228 is a VMware NSX™ manager running on any computer, such as one of the hosts or a virtual machine in the on-premise hyper-converged system 200.

The on-premise hyper-converged system 200 also includes at least one physical edge appliance 234 to control network traffic between the on-premise hyper-converged system 200 and the SD-WAN 120. The edge appliance allows the cloud service 102 to access various software components of the on-premise hyper-converged system 200 via the SD-WAN 120. The on-premise hyper-converged system 200 may implemented in a single server rack with all the hardware components or in multiple server racks that are connected to each other.

Figure 3A:
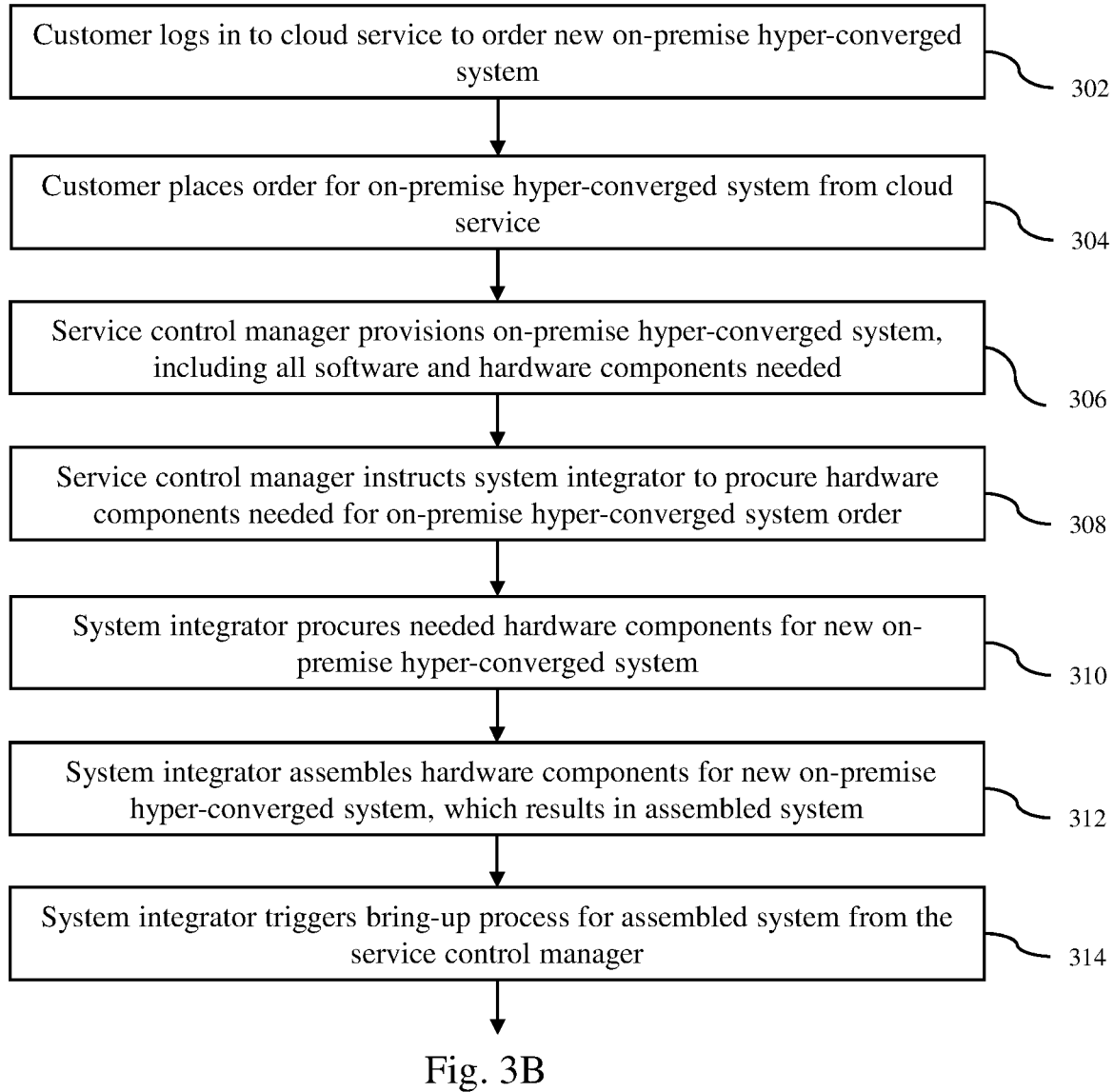
FIGS. 3A and 3B show a process flow diagram of a process of supplying and managing an on-premise hyper-converged system using the distribute system of FIG. 1 in accordance with an embodiment of the invention.
Figure 3B:
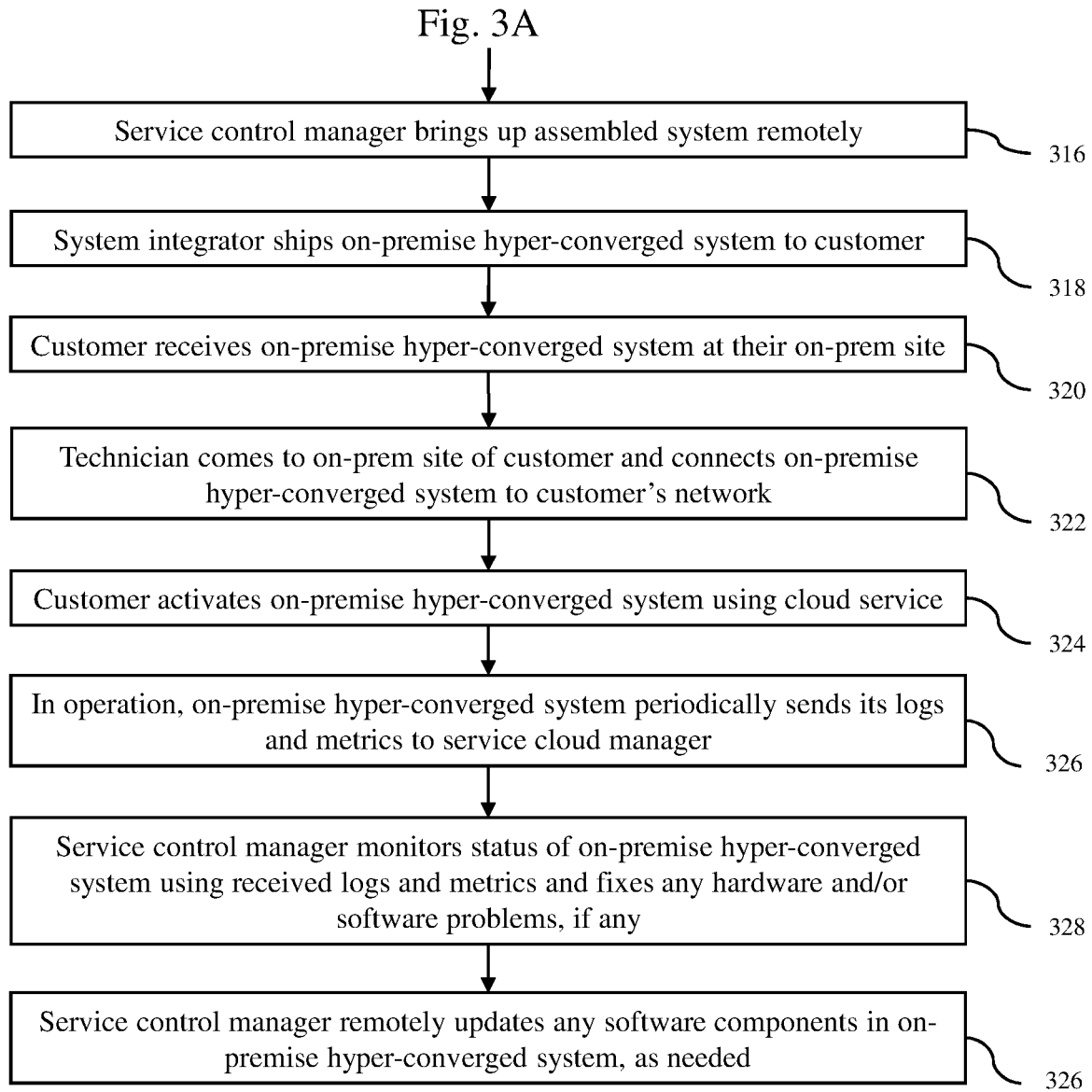
Figure 4A:
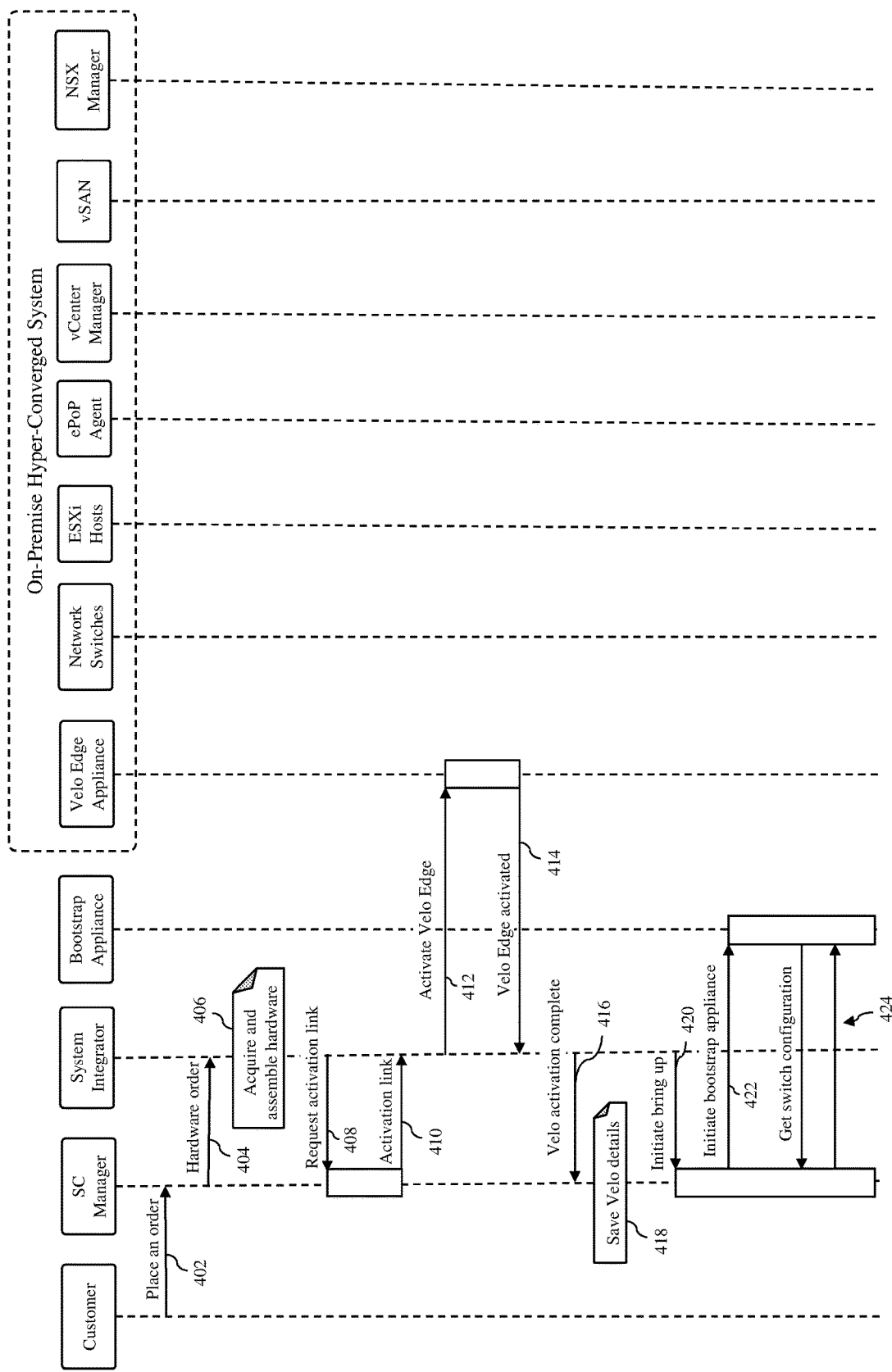
FIGS. 4A-4E show a sequence diagram of a process of supplying and managing an on-premise hyper-converged system using the distribute system of FIG. 1 in accordance with a particular implementation.
Figure 4B:
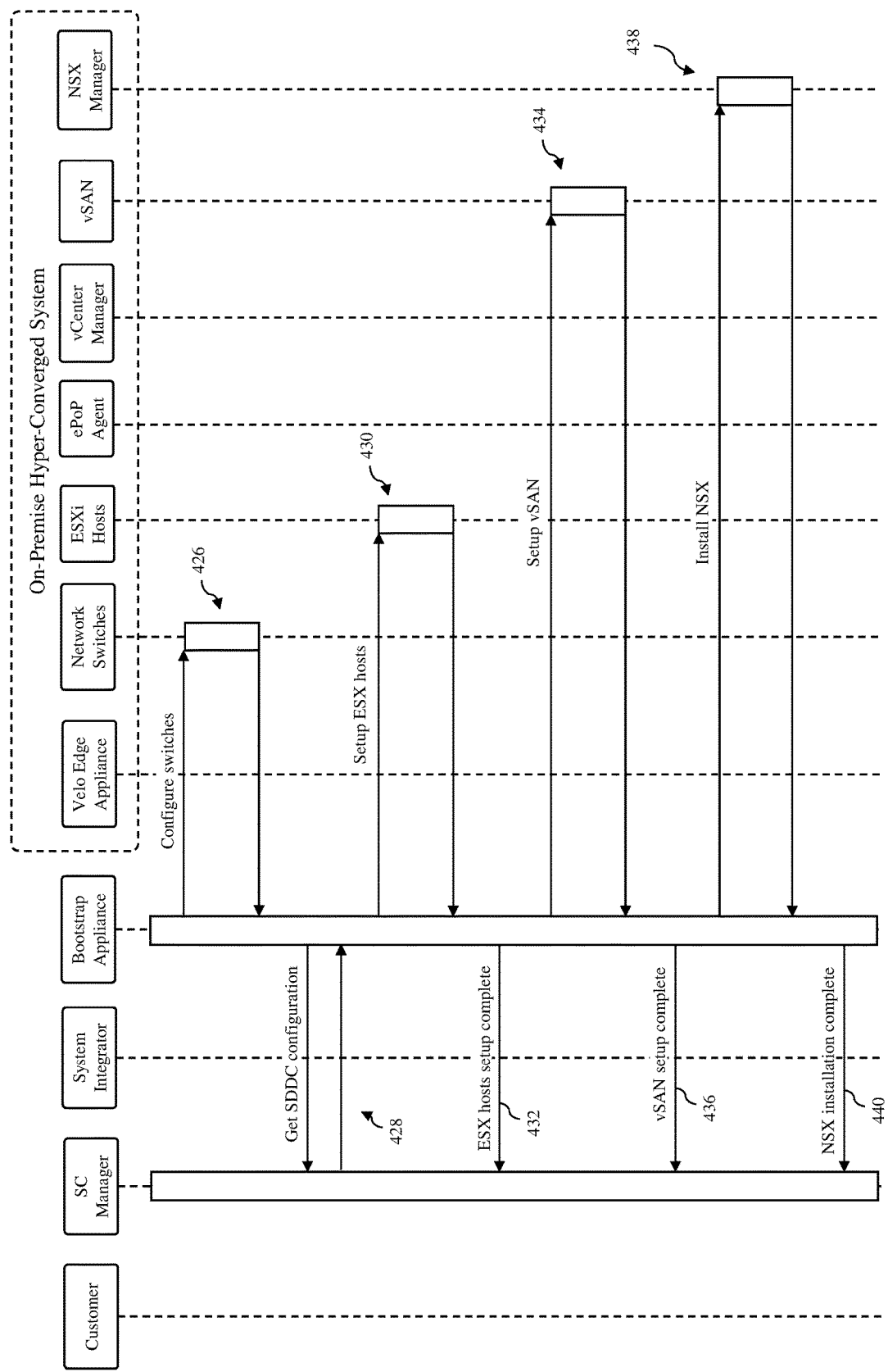
Figure 4C:
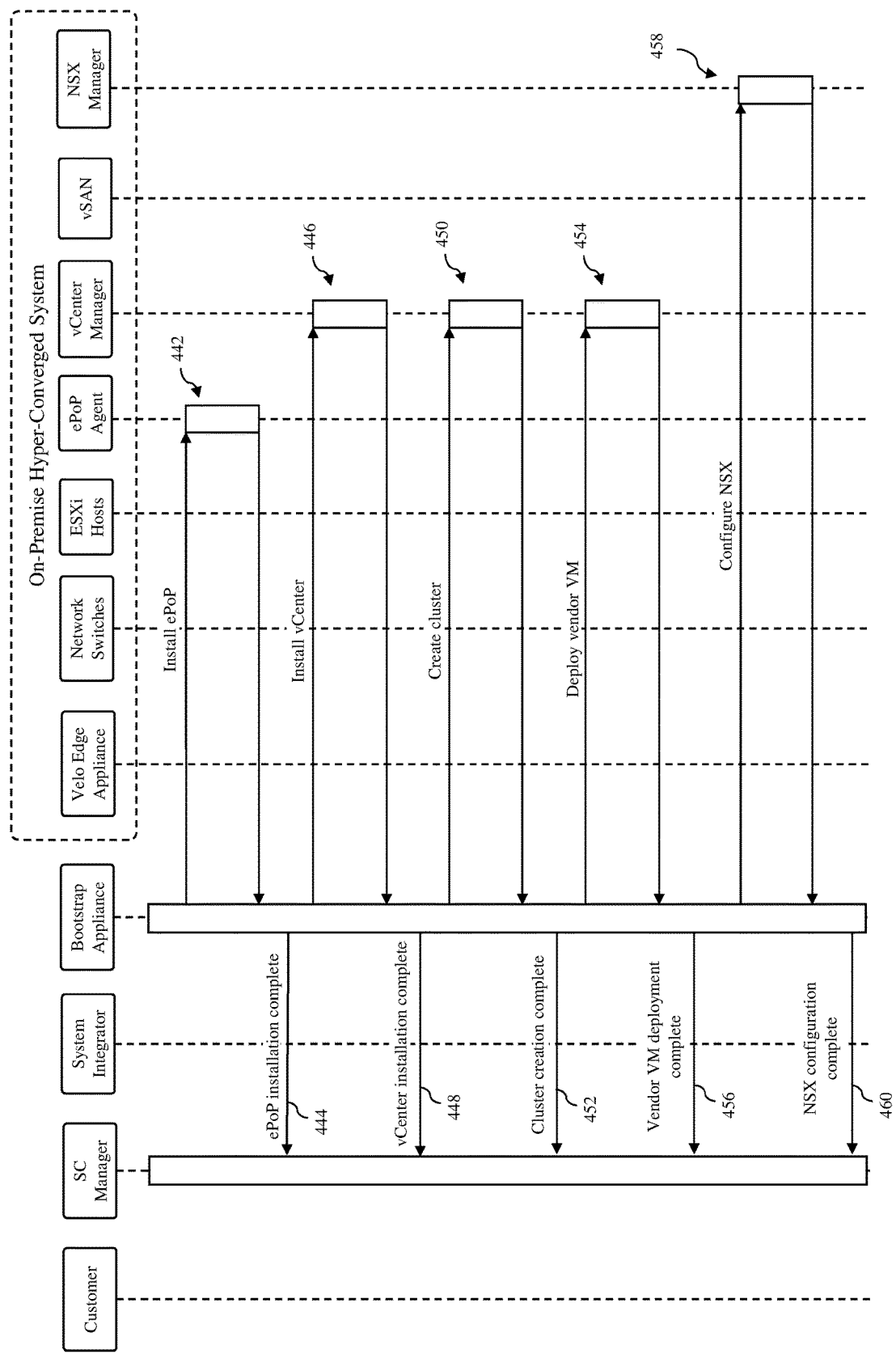
Figure 4D:
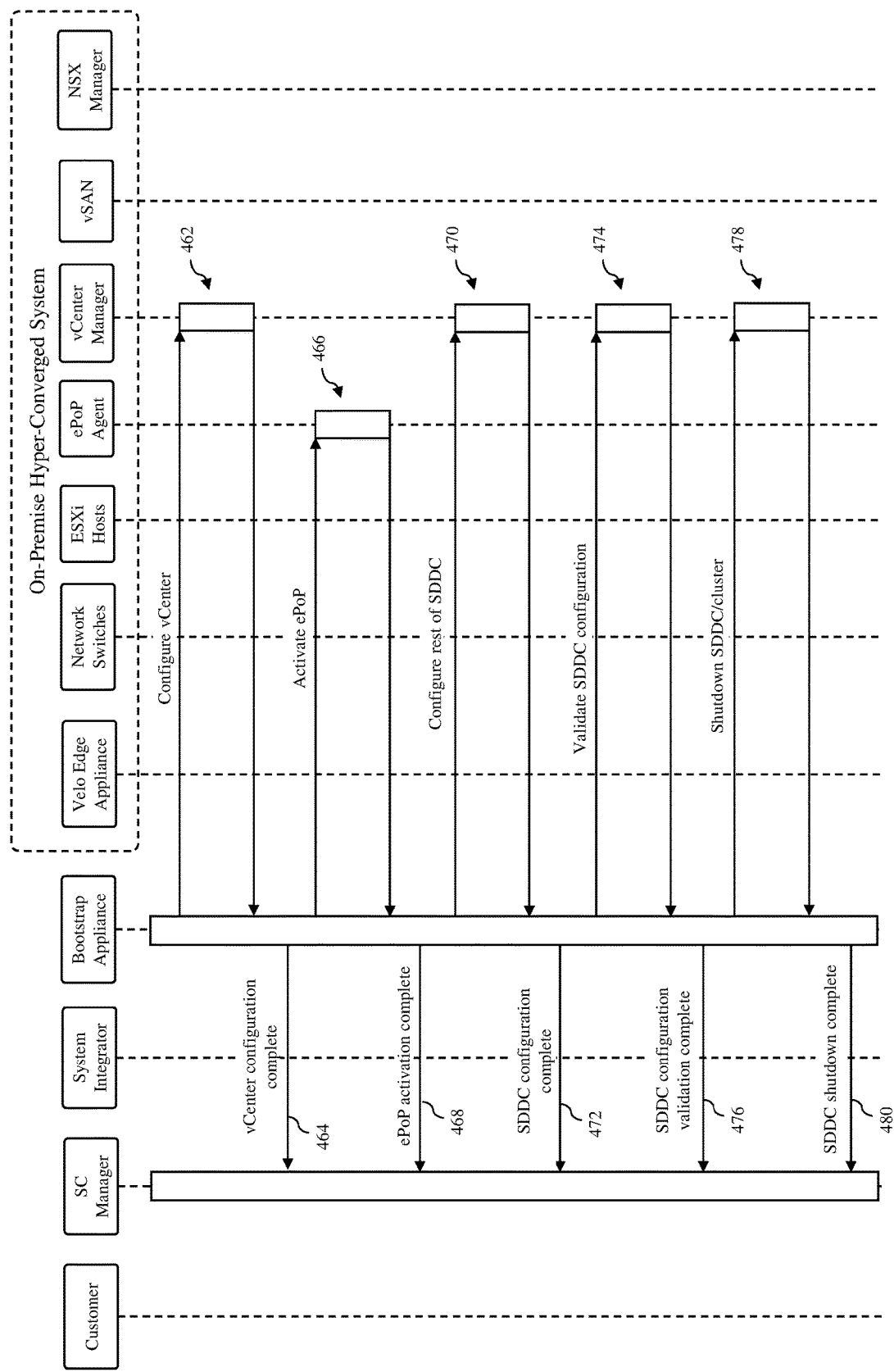
Figure 4E:
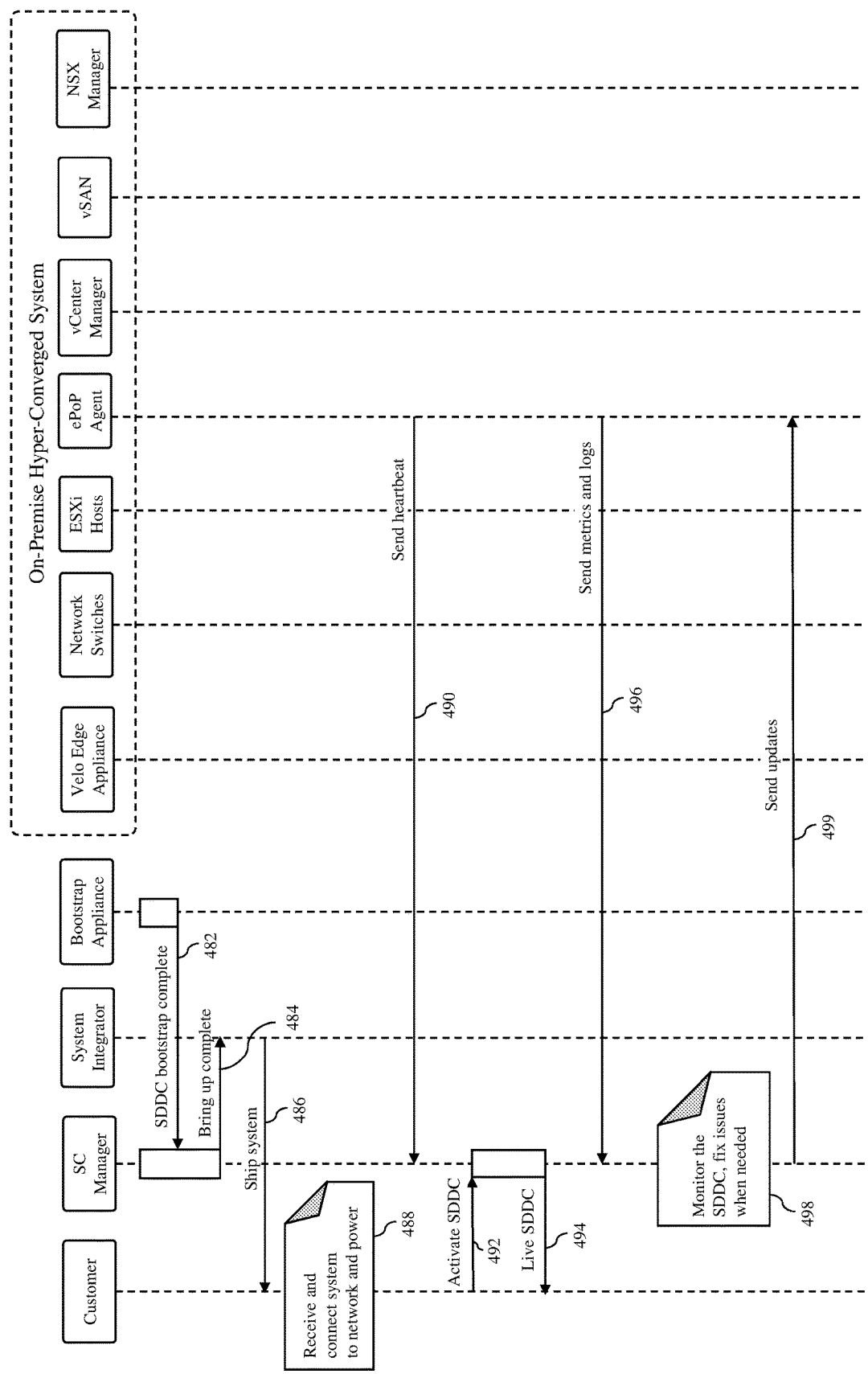

A process of supplying and managing an on-premise hyper-converged system using the distributed system 100 in accordance with an embodiment of the invention is described with reference to a process flow diagram of FIGS. 3A and 3B. At block 302, a customer logs in to the cloud service 102 to order a new on-premise hyper-converged system. In an embodiment, the service control manager 108 of the cloud service 102 may provide a web-based user interface to allow customers to log in to the cloud service to order new on-premise hyper-converged systems. Next, at block 304, the customer places an order for the on-premise hyper-converged system from the cloud service 102, which involves selecting hardware and software for the on-premise hyper-converged system. In an embodiment, the customer may use the web-based user interface provided by the cloud service 102 to place the order.

Next, at block 306, in response to the order, the service control manager 108 provisions the on-premise hyper-converged system, including all the software and hardware components needed for the on-premise hyper-converged system. As part of this process, the service control manager 108 creates a VPC in the cloud service for the new on-premise hyper-converged system. In addition, the service control manager 108 may create a VeloCloud™ edge profile, generate IP addresses, create credentials, etc. Next, at block 308, the service control manager 108 instructs the system integrator 128 to procure the hardware components needed for the on-premise hyper-converged system order. In an embodiment, the service cloud manager 108 may send a hardware order to the system integrator 128 based on the on-premise hyper-converged system order. Next, at block 310, in response to the instruction, the system integrator 128 procures the needed hardware components for the new on-premise hyper-converged system, which may include one or more server racks, host computers (servers), networking components, one or more physical gateway appliances to connect to the SD-WAN 120 and other physical components commonly found in server rack systems. The hardware components may be acquired from one or more suppliers and/or manufactured by the system integrator 128.

Next, at block 312, the system integrator 128 assembles the hardware components for the new on-premise hyper-converged system, which results in an assembled system, which may be a physical system of one or more server racks without any SDDC-related software components being installed. In an embodiment, one or more personnel of the system integrator 128 may manually assemble the hardware components to produce the assembled system. Next, at block 314, the system integrator 128 triggers a bring-up process for the assembled system from the service control manager 108. In an embodiment, this involves connecting the assembled assembly to the SD-WAN 120 and accessing the cloud service 102 to select a bring-up process for the assembled system. The system integrator 128 is only allowed to initiate the bring-up process for certain orders based on the manufacturer of the hardware that the customer requested. The system integrator 128 cannot access orders for systems that are to be fulfilled by another the system integrator.

Next, at block 316, the service control manager 108 brings up the assembled system remotely, which results in a fully operational new on-premise hyper-converged system. In an embodiment, this process involves deploying a bring-up appliance 114 in the VPC for the new on-premise hyper-converged system being built, which manages the installation and configuration of the SDDC-related software components in the assembled system to produce the on-premise hyper-converged system, as ordered. In an embodiment, the bring-up appliance may be a Linux-based virtual machine. During the bring-up process, the bring-up appliance 114 is initialized with a token to access configuration associated with the specific system that is being brought up. The token is bound to the order for a single system and no other system's information can be accessed. All credentials for the on-premise hyper-converged system are generated and stored in the cloud service 102. The bring-up process will retrieve the necessary secrets from the cloud service 102 using an initial token and the service control manager 108 will set the credentials on the managed system directly through APIs. This design assures that no credentials will be handled or leaked by any middleman, including the system integrator 128.

Next, at block 318, the system integrator 128 ships the on-premise hyper-converged system to the customer. Next, at block 320, the customer receives the on-premise hyper-converged system at their on-prem site. Next, at block 322, a technician (who may be from the system integrator 128) comes to the on-prem site of the customer and connects the on-premise hyper-converged system to the customer's network, which may be the customer's private network, ensuring that the gateway appliance of the on-premise hyper-converged system is connected to the SD-WAN 120. Next, at block 324, the customer activates the on-premise hyper-converged system using the cloud service 102. The on-premise hyper-converged system is now live for the customer to use the on-premise hyper-converged system and at least one SDDC running on the on-premise hyper-converged system.

Next, at block 326, in operation, the on-premise hyper-converged system periodically sends its logs and metrics to the service cloud manager 108. Next, at block 328, the service control manager 108 monitors the status of the on-premise hyper-converged system using the received logs and metrics and fixes any hardware and/or software problems, if any. Next, at block 330, the service control manager 108 remotely updates any software components in the on-premise hyper-converged system, in particular, the SDDC-related software components, as needed. In this manner, the cloud service 102 manages the on-premise hyper-converged system operating at the customer's on-prem site.

In a particular implementation, some of the SDDC-related software components that are installed and configured in an on-premise hyper-converged system are SDDC-related software components made commercially available from VMware, Inc. As an example, the SDDC-related software components may include VMware ESXi™ hypervisors provided as part of VMware vSphere® solution, a VMware End-Point Operations (EPOps) agent, a VMware vCenter Server® product, a VMware vSAN product and a VMware® NSX Manager™ product.

A process of supplying and managing an on-premise hyper-converged system using the distributed system 100 in accordance with the particular implementation is described with reference to a sequence diagram of FIGS. 4A-4E. The process begins at step 402, where a customer logs in to the service cloud manager 108 to order an on-premise hyper-converged system. Next, at step 404, the service cloud manager sends a hardware order to the system integrator 128 for the on-premise hyper-converged system to instruct the system integrator to procure the necessary hardware for the order. Next, at step 406, in response to the hardware order, the system integrator 128 acquires the necessary hardware for the on-premise hyper-converged system order, including a VeloCloud™ edge appliance, and assembles the hardware (e.g., rack and stack) to produce an assembled system. The step of ordering and assembling the hardware for the on-premise hyper-converged system may be performed by one or more personnel of the system integrator 128.

Next, at step 408, the system integrator 128 sends a request to the service cloud manager 108 for a VeloCloud™ edge activation link. Next, at step 410, in response to the link request, the service cloud manager 108 generates and sends the activation link. Next, at step 412, using the activation link, the system integrator 128 activates the VeloCloud™ edge appliance (indicated as "Velo Edge Appliance" in FIGS. 4A-4E) the assembled system. Next, at step 414, the VeloCloud™ edge appliance sends a notification to the system integrator 128 that indicates that the appliance has been activated.

Next, at step 416, the system integrator 128 sends a notification to the service cloud manager 108 that the activation of the VeloCloud™ edge appliance has been completed. In response, at step 418, the service cloud manager 108 saves the details of the activated VeloCloud™ edge appliance. Next, at step 420, the system integrator 128 initiates a bring-up process for the assembled system, which may involve a personnel of the system integrator entering a command on a web-based user interface provided by the service cloud manager 108.

Next, at step 422, the service cloud manager 108 initiates a bring-up appliance 114 in a VPC that was created for the on-premise hyper-converged system being built. In response, at step 424, the bring-up appliance 114 gets switch configuration from the service cloud manager 108. Next, at step 426, the bootstrap appliance configures the network switches in the assembled system.

Next, at step 428, the bring-up appliance 114 gets SDDC configuration from the service cloud manager 108. In an embodiment, SDDC configuration contains the configuration needed by the bring-up appliance to setup the SDDC. For example, the configuration may include cluster name and information for host, switch, etc. (such as hostname, IP address, account username and password, etc.). The configuration may also contain information on how to configure a virtual storage area network (e.g., VMware vSAN), network, etc. Next, at step 430, the bring-up appliance 114 sets up ESXi hosts in the assembled system. Next, at step 432, the bring-up appliance 114 sends a notification to the service cloud manager 108 that the setup of the ESXi hosts has been completed.

Next, at step 434, the bring-up appliance 114 sets up a virtual SAN (vSAN) in the assembled system. Next, at step 436, the bring-up appliance 114 sends a notification to the service cloud manager 108 that the setup of the vSAN has been completed.

Next, at step 438, the bring-up appliance 114 installs an NSX manager in the assembled system. Next, at step 440, the bring-up appliance 114 sends a notification to the service cloud manager 108 that the installation of the NSX manager has been completed.

Next, at step 442, the bring-up appliance 114 installs an endpoint operations management (ePoP) agent in the assembled system. Next, at step 444, the bring-up appliance 114 sends a notification to the service cloud manager 108 that the installation of the ePoP agent has been completed.

Next, at step 446, the bring-up appliance 114 installs a vCenter manager in the assembled system. Next, at step 448, the bring-up appliance 114 sends a notification to the service cloud manager 108 that the setup of the vCenter manager has been completed.

Next, at step 450, the bring-up appliance 114 instructs the vCenter manager to create a cluster of host computers in the assembled system. Next, at step 452, after the vCenter manager has created the cluster, the bring-up appliance 114 sends a notification to the service cloud manager 108 that the cluster creation has been completed.

Next, at step 454, the bring-up appliance 114 instructs the vCenter manager to deploy virtual machines (VMs) on the cluster of host computers in the assembled system. Next, at step 456, after the vCenter manager has deployed the virtual machines, the bring-up appliance 114 sends a notification to the service cloud manager 108 that the virtual machine deployment has been completed.

Next, at step 458, the bring-up appliance 114 configures the NSX manager in the assembled system. Next, at step 460, the bring-up appliance 114 sends a notification to the service cloud manager 108 that the configuration of the NSX manager has been completed.

Next, at step 462, the bring-up appliance 114 configures the vCenter manager in the assembled system. Next, at step 464, the bring-up appliance 114 sends a notification to the service cloud manager 108 that the configuration of the vCenter manager has been completed.

Next, at step 466, the bring-up appliance 114 activates the ePoP agent in the assembled system. Next, at step 468, the bring-up appliance 114 sends a notification to the service cloud manager 108 that the activation of the ePoP agent has been completed.

Next, at step 470, the bring-up appliance 114 configures the rest of the SDDC in the assembled system. Next, at block 472, the bring-up appliance 114 sends a notification to the service cloud manager 108 that the configuration of the SDDC has been completed.

Next, at step 474, the bring-up appliance 114 validates the SDDC configuration in the assembled system. In an embodiment, the validation of the SDDC configuration may involve various validation checks, such as whether the vCenter manager is up, whether a vSAN cluster is up, whether the NSX manager is up, whether the ePoP agent is up, etc. Next, at step 476, the bring-up appliance 114 sends a notification to the service cloud manager 108 that the validation of the SDDC configuration has been completed. The assembled system can now be considered to be a completed on-premise hyper-converged system.

Next, at step 478, the bring-up appliance 114 shuts down the SDDC in the on-premise hyper-converged system using the vCenter manager. Next, at block 480, the bring-up appliance 114 sends a notification to the service cloud manager 108 that the shutdown has been completed. Next, at step 482, the bring-up appliance 114 sends another notification to the service cloud manager 108 that the SDDC bootstrap has been completed.

Next, at step 484, the service cloud manager 108 sends a notification to the system integrator 128 that the bring-up process has been completed. Next, at step 486, the system integrator 128 ships the on-premise hyper-converged system to the customer. Next, at step 488, the customer receives the on-premise hyper-converged system and a technician connects the on-premise hyper-converged system to the customer's network and power. In an embodiment, the technician may be from the system integrator 128.

Next, at step 490, the ePoP agent running in the on-premise hyper-converged system sends a heartbeat to the service cloud manager 108 to indicate that the on-premise hyper-converged system has been powered up and network connected. Next, at step 492, the customer activates the SDDC in the on-premise hyper-converged system using the user interface provided by the service cloud manager 108. Next, at step 494, the service cloud manager 108 sends a notification that the SDDC is live and ready to use.

Next, at step 492, the customer uses the SDDC running on the on-premise hyper-converged system, which may include deploying virtual machines to run workloads. Next, at step 496, the ePoP agent periodically sends metrics and logs to the service cloud manager 108. In an embodiment, metrics and logs for both software and hardware stack are sent to the service cloud manager 108. Software stack includes the ePoP itself, the vCenter manger, VMware ESXi™ hypervisors, virtual machines, etc. Hardware stack includes hosts, switches, VeloCloud™ edge appliances, etc. Next, at step 498, the service cloud manager 108 monitors the SDDC running on the on-premise hyper-converged system using the received logs and metrics and fixes any hardware and/or software problems in the on-premise hyper-converged system, if any. Next, at block 499, the service cloud manager 108 remotely updates any software or hardware components in the on-premise hyper-converged system, in particular, the SDDC-related software components, as needed.

Figure 5:
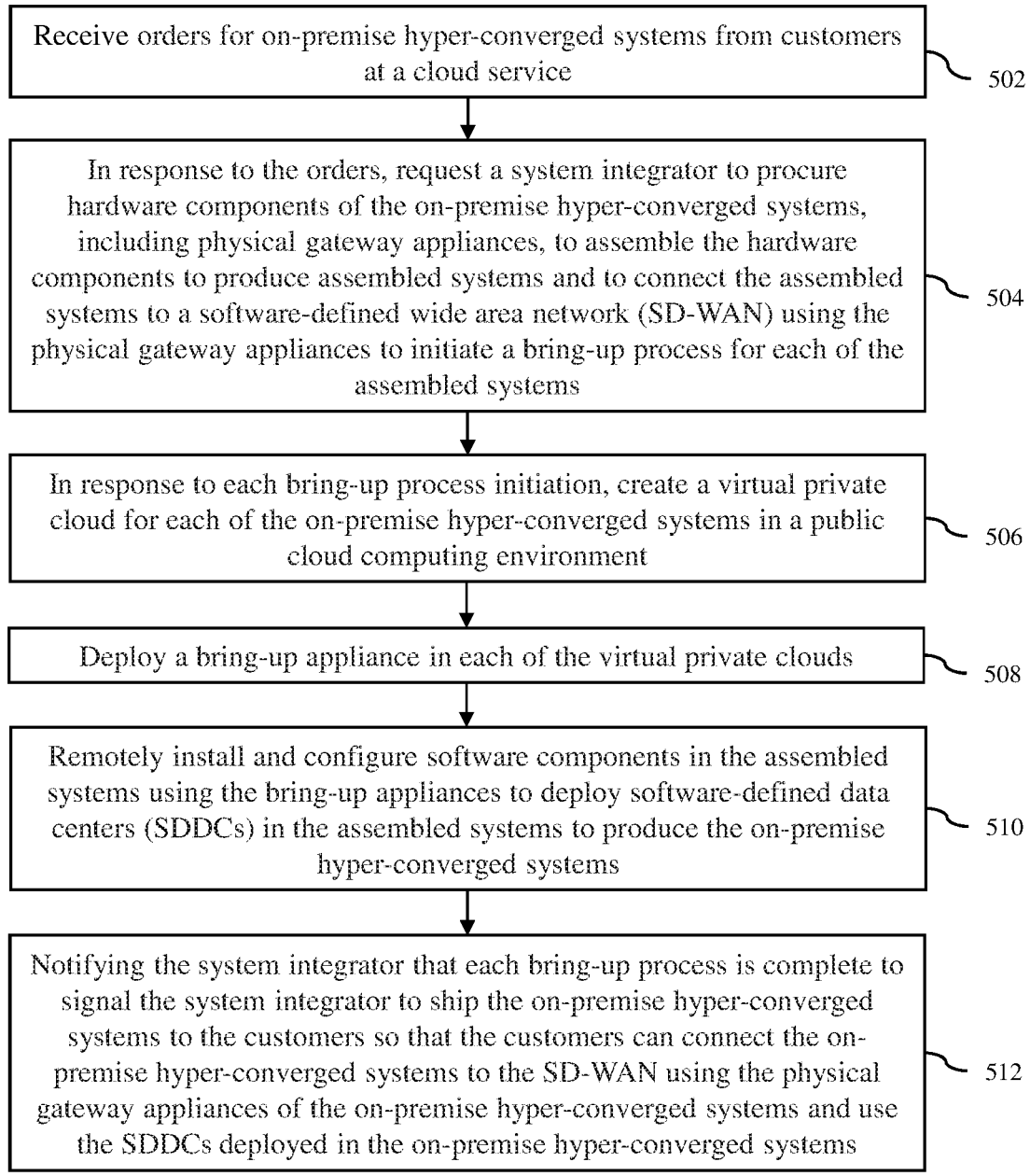
FIG. 5 is a flow diagram of a computer-implemented method for supplying on-premise hyper-converged systems in accordance with an embodiment of the invention.

A computer-implemented method for supplying on-premise hyper-converged systems in accordance with an embodiment of the invention is described with reference to a flow diagram of FIG. 5. At block 502, orders for the on-premise hyper-converged systems are received from customers at a cloud service. At block 504, in response to the orders, a system integrator is requested to procure hardware components of the on-premise hyper-converged systems, including physical gateway appliances, to assemble the hardware components to produce assembled systems and to connect the assembled systems to an SD-WAN using the physical gateway appliances to initiate a bring-up process for each of the assembled systems. At block 506, in response to each bring-up process initiation, a virtual private cloud is created for each of the on-premise hyper-converged systems in a public cloud computing environment. At block 508, a bring-up appliance is deployed in each of the virtual private clouds. At block 510, software components are remotely installed and configured in the assembled systems using the bring-up appliances to deploy software-defined data centers (SDDCs) in the assembled systems to produce the on-premise hyper-converged systems. At block 512, the system integrator is notified that each bring-up process is complete to signal the system integrator to ship the on-premise hyper-converged systems to the customers so that the customers can connect the on-premise hyper-converged systems to the SD-WAN using the physical gateway appliances of the on-premise hyper-converged systems and use the SDDCs deployed in the on-premise hyper-converged systems.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for supplying on-premise hyper-converged systems, the method comprising:
receiving orders for the on-premise hyper-converged systems from customers at a cloud service;
in response to the orders, requesting a system integrator to procure hardware components of the on-premise hyper-converged systems, including physical gateway appliances, to assemble the hardware components to produce assembled systems and to connect the assembled systems to a software-defined wide area network (SD-WAN) using the physical gateway appliances to initiate a bring-up process for each of the assembled systems, wherein the SD-WAN is connected to the cloud service;
in response to each bring-up process initiation, creating a virtual private cloud for each of the on-premise hyper-converged systems being produced in a public cloud computing environment;
deploying a bring-up appliance in each of the virtual private clouds, wherein the bring-up appliance in each of the virtual private clouds manages installation and configuration of software-defined data center (SDDC)-related software components for an associated assembled system to produce each of the on-premise hyper-converged systems;
remotely installing and configuring the SDDC-related software components in the assembled systems using the bring-up appliances in the virtual private clouds to deploy SDDCs in the assembled systems via the SD-WAN to produce the on-premise hyper-converged systems; and
notifying the system integrator that each bring-up process is complete to signal the system integrator to ship the on-premise hyper-converged systems to the customers so that the customers can connect the on-premise hyper-converged systems to the SD-WAN using the physical gateway appliances of the on-premise hyper-converged systems and use the SDDCs deployed in the on-premise hyper-converged systems.

2. The method of claim 1, further comprising deploying reverse proxies in each of the virtual private clouds to communicate with some of the SDDC-related software components installed in the on-premise hyper-converged systems.

3. The method of claim 1, further comprising receiving logs and metrics from the on-premise hyper-converged systems at the cloud service and remotely fixing any software or hardware issues of the on-premise hyper-converged systems in response to the received logs and metrics.

4. The method of claim 1, further comprising remotely installing updates for some of the SDDC-related software components installed in the on- premise hyper-converged systems from the cloud service via the SD-WAN.

5. The method of claim 1, wherein remotely installing and configuring the SDRC-related software components in the assembled systems using the bring-up appliances includes installing a logical network manager in each of the on-premise hyper-converged systems to create logical overlay networks in the on-premise hyper-converged systems.

6. The method of claim 1, wherein remotely installing and configuring the SDDC-related software components in the assembled systems using the bring-up appliances includes installing a virtualization manager in each of the on-premise hyper-converged systems to manage deployment of virtual computing instances in the respective SDDCs in the on-premise hyper-converged systems.

7. The method of claim 1, wherein remotely installing and configuring the SDDC-related software components in the assembled systems using the bring-up appliances includes using software bundles in database accessible by the cloud service, wherein the software bundles in the database are the latest versions of the SDDC- related software components to be installed in the on-premise hyper-converged systems.

8. The method of claim 1, further comprising deploying a jumpbox appliance in one of the virtual private clouds for a customer to access the on-premise hyper-converged system associated with that virtual private cloud.

9. A non-transitory computer-readable storage medium containing program instructions for method for supplying on-premise hyper-converged systems, wherein execution of the program instructions by one or more processors of a computer causes the one or more processors to perform steps comprising:
receiving orders for the on-premise hyper-converged systems from customers at a cloud service;
in response to the orders, requesting a system integrator to procure hardware components of the on-premise hyper-converged systems, including physical gateway appliances, to assemble the hardware components to produce assembled systems and to connect the assembled systems to a software-defined wide area network (SD-WAN) using the physical gateway appliances to initiate a bring-up process for each of the assembled systems, wherein the SD-WAN is connected to the cloud service;
in response to each bring-up process initiation, creating a virtual private cloud for each of the on-premise hyper-converged systems being produced in a public cloud computing environment;
deploying a bring-up appliance in each of the virtual private clouds, wherein the bring-up appliance in each of the virtual private clouds manages installation and configuration of software-defined data center (SDDC)-related software components for an associated assembled system to produce each of the on-premise hyper-converged systems;
remotely installing and configuring software components in the assembled systems using the bring-up appliances in the virtual private clouds to deploy SDDCs in the assembled systems via the SD-WAN to produce the on-premise hyper-converged systems; and
notifying the system integrator that each bring-up process is complete to signal the system integrator to ship the on-premise hyper-converged systems to the customers so that the customers can connect the on-premise hyper-converged systems to the SD-WAN using the physical gateway appliances of the on--premise hyper--converged systems and use the SDDCs deployed in the on-premise hyper-converged systems.

10. The computer-readable storage medium of claim 9, wherein the steps further comprise deploying reverse proxies in each of the virtual private clouds to communicate with some of the SDRC-related software components installed in the on-premise hyper-converged systems.

11. The computer-readable storage medium of claim 9, wherein the steps further comprise receiving logs and metrics from the on-premise hyper-converged systems at the cloud service and remotely fixing any software or hardware issues of the on-premise hyper-converged systems in response to the received logs and metrics.

12. The computer-readable storage medium of claim 9, wherein the steps further comprise remotely installing updates for some of the SDDC-related software components installed in the on-premise hyper-converged systems from the cloud service via the SD-WAN.

13. The computer-readable storage medium of claim 9, wherein remotely installing and configuring the SDDC- related software components in the assembled systems using the bring-up appliances includes installing a logical network manager in each of the on-premise hyper-converged systems to create logical overlay networks in the on-premise hyper-converged systems.

14. The computer-readable storage medium of claim 9, wherein remotely installing and configuring the SDDC-related software components in the assembled systems using the bring-up appliances includes installing a virtualization manager in each of the on-premise hyper-converged systems to manage deployment of virtual computing instances in the respective SDDCs in the on-premise hyper-converged systems.

15. The computer-readable storage medium of claim 9, wherein remotely installing and configuring the LDDC-related software components in the assembled systems using the bring-up appliances includes using software bundles in database accessible by the cloud service, wherein the software bundles in the database are the latest versions of the SDDC-related software components to be installed in the on- premise hyper-converged systems.

16. The computer-readable storage medium of claim 9, wherein the steps further comprise deploying a jumpbox appliance in one of the virtual private clouds for a customer to access the on-premise hyper-converged system associated with that virtual private cloud.

17. A system comprising:
memory; and
at least one processor configured to:
receive orders for on-premise hyper-converged systems from customers at a cloud service; in response to the orders, request a system integrator to procure hardware components of the on-premise hyper-converged systems, including physical gateway appliances, to assemble the hardware components to produce assembled systems and to connect the assembled systems to a software-defined wide area network (SD-WAN) using the physical gateway appliances to initiate a bring-up process for each of the assembled systems, wherein the SD-WAN is connected to the cloud service;
in response to each bring-up process initiation, create a virtual private cloud for each of the on-premise hyper-converged systems being produced in a public cloud computing environment;
deploy a bring-up appliance in each of the virtual private clouds, wherein the bring-up appliance in each of the virtual private clouds manages installation and configuration of software-defined data center (SDDC)-related software components for an associated assembled system to produce each of the on-premise hyper-converged systems;
remotely install and configure software components in the assembled systems using the bring-up appliances in the virtual private clouds to deploy SDDCs in the assembled systems via the SD- WAN to produce the on-premise hyper-converged systems; and
notify the system integrator that each bring-up process is complete to signal the system integrator to ship the on-premise hyper-converged systems to the customers so that the customers can connect the on-premise hyper-converged systems to the SD-WAN using the physical gateway appliances of the on-premise hyper-converged systems and use the SDDCs deployed in the on-premise hyper-converged systems.

18. The system of claim 17, wherein the at least one processor is configured to deploy reverse proxies in each of the virtual private clouds to communicate with some of the SDDC-related software components installed in the on-premise hyper-converged systems.

19. The system of claim 17, wherein the at least one processor is configured to receive logs and metrics from the on-premise hyper-converged systems at the cloud service and remotely fix any software or hardware issues of the on-premise hyper-converged systems in response to the received logs and metrics.

20. The system of claim 17, wherein the at least one processor is configured to remotely install updates for some of the SDDC-related software components installed in the on-premise hyper-converged systems via the SD-WAN.

* * * * *